(12) United States Patent
Hu et al.

(10) Patent No.: US 10,943,148 B2
(45) Date of Patent: Mar. 9, 2021

(54) INSPECTION NEURAL NETWORK FOR ASSESSING NEURAL NETWORK RELIABILITY

(71) Applicant: Apple Inc., Cupertino, CA (US)

(72) Inventors: Rui Hu, Santa Clara, CA (US); Ruslan Salakhutdinov, Pittsburgh, PA (US); Nitish Srivastava, San Francisco, CA (US); YiChuan Tang, Mississauga (CA)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 15/828,408

(22) Filed: Nov. 30, 2017

(65) Prior Publication Data

US 2018/0157934 A1    Jun. 7, 2018

Related U.S. Application Data

(60) Provisional application No. 62/429,592, filed on Dec. 2, 2016.

(51) Int. Cl.

| G06K 9/62 | (2006.01) |
| G06N 3/04 | (2006.01) |
| G06N 3/08 | (2006.01) |
| G05D 1/02 | (2020.01) |
| G06K 9/00 | (2006.01) |
| G06K 9/46 | (2006.01) |
| G06K 9/66 | (2006.01) |

(52) U.S. Cl.
CPC ......... *G06K 9/6262* (2013.01); *G05D 1/0246* (2013.01); *G06K 9/00791* (2013.01); *G06K 9/00805* (2013.01); *G06K 9/4628* (2013.01); *G06K 9/6256* (2013.01); *G06K 9/66* (2013.01); *G06N 3/0454* (2013.01); *G06N 3/08* (2013.01); *G06N 3/084* (2013.01); *G05D 2201/0213* (2013.01)

(58) Field of Classification Search
CPC ........ G05D 1/0246; G05D 2201/0213; G06K 9/00791; G06K 9/00805; G06K 9/4628; G06K 9/6256; G06K 9/6262; G06K 9/66; G06N 3/0454; G06N 3/08; G06N 3/084
See application file for complete search history.

(56) References Cited

U.S. PATENT DOCUMENTS

| 8,775,341 B1 | 7/2014 | Commons |
| 2008/0082468 A1 | 4/2008 | Long et al. |
| 2017/0008521 A1* | 1/2017 | Braunstein ............. G01C 21/32 |
| 2017/0206434 A1* | 7/2017 | Nariyambut Murali ..................... G06K 9/628 |

* cited by examiner

*Primary Examiner* — Manuchehr Rahmjoo
(74) *Attorney, Agent, or Firm* — Robert C. Kowert; Kowert, Hood, Munyon, Rankin & Goetzel, P.C.

(57) ABSTRACT

A system employs an inspection neural network (INN) to inspect data generated during an inference process of a primary neural network (PNN) to generate an indication of reliability for an output generated by the PNN. The system includes a sensor configured to capture sensor data. Sensor data captured by the sensor is provided to a data analyzer to generate an output using the PNN. An analyzer inspector is configured to capture inspection data associated with the generation of the output by the data analyzer, and use the INN to generate an indication of reliability for the PNN's output based on the inspection data. The INN is trained using a set of training data that is distinct from the training data used to train the PNN.

17 Claims, 9 Drawing Sheets

INSPECTION NEURAL NETWORK FOR ASSESSING NEURAL NETWORK RELIABILITY

PRIORITY INFORMATION

This application claims benefit of priority to U.S. Provisional Application No. 62/429,592, filed Dec. 2, 2016, titled "Inspection Neural Network for Assessing Neural Network Reliability," which is hereby incorporated by reference in its entirety.

BACKGROUND

Technical Field

This disclosure relates generally to systems and algorithms for machine learning and machine learning models, and in particular using machine learning techniques to determine the reliability of neural networks.

Description of the Related Art

When using neural networks to generate outputs from input data sets, it is often useful to generate, in conjunction with the output, a measure of the reliability or likely error of the output. In real world uses of neural networks, such reliability measures must be generated on the fly, without knowledge of the ground truth. In one conventional approach, a reliability metric may be determined for a neural network output using a mathematical function, such as a polynomial function, that computes the measure based on the output of neurons in the neural network. However, such mathematical functions do not generally produce satisfactory results, because they fail to capture the complexity of decision making process of the network. In another conventional approach, the neural network itself may be configured to generate a reliability metric along with its output. However, such self-reporting of reliability is typically flawed, because the output is evaluated based on the same knowledge that was used to generate it, and the network is generally blind to its own shortcomings. For this reason, self-reported reliability metrics tend to be biased in favor of the network, and they do not represent good measures of the network's reliability.

SUMMARY OF EMBODIMENTS

Various embodiments of methods and systems are disclosed herein to determine the reliability of the output of a neural network using an inspection neural network (INN). The inspection neural network may be used to examine data generated from a primary neural network (PNN) during the PNN's decision making or inference process. The examined data may include the initial input data to the PNN, the final output of the PNN, and also any intermediate data generated during the inference process. Based on this data, the INN may generate a reliability metric for an output of PNN. The reliability metric generated using the embodiments described herein may be significantly more accurate than reliability metrics generated using conventional methods.

The generation of accurate reliability metrics for the output of neural networks is of great importance in many applications of neural networks. As one example, a neural network may be used by an autonomous vehicle to analyze images of the road, generating output that are used by the vehicle's navigation system to drive the vehicle. The output of the neural network may indicate for example a drivable region in the image; other objects on the road such as other cars of pedestrians; and traffic objects such as traffic lights, signs, and lane markings. In such a setting, it is important that the navigation system receive not just the analytical output of the neural network, but also a reliability measure indicating the confidence level or potential probably of error associated with the output. The navigation system may adjust its behavior according to the reliability measure. For example, when the autonomous vehicle is driving under bad lighting conditions, the output generated by the neural network may be less reliable. In that case, the navigation system may be provided low measures of reliability for with the network's outputs, which may cause the navigation system to slow the speed of the vehicle. In some cases, the navigation system may switch from a sensor generating less reliable data to another sensor that is generating more reliable data.

In one conventional approach, a reliability metric may be generated for a neural network output using a mathematical function, such as a polynomial function, that computes the measure based on the output of neurons in the neural network. However, such mathematical functions do not generally produce satisfactory results, because they fail to capture the complexity of decision making process of the network. In another conventional approach, the neural network itself may be configured to generate a reliability metric along with its output. However, such self-reporting of reliability is typically flawed, because the output is evaluated based on the same knowledge that was used to generate it, and the network is generally blind to its own shortcomings. For this reason, self-reported reliability metrics tend to be biased in favor of the network, and they do not represent good measures of the network's reliability.

In some embodiments disclosed herein, a computer implemented method is described. The method includes receiving input data for a PNN captured by one or more sensors. The method then generates a output using the PNN based on the input data. The method includes capturing certain inspection data associated with the generation of the output. The method also includes generating an indication of reliability for the output using an INN based on the inspection data. The method further includes transmitting the output and the indication of reliability to a controller. In the embodiments, the PNN is trained using a different set of training data from the training data set used to train the INN.

In some embodiments disclosed herein, a system is described. The system includes a sensor that is configured to capture sensor data. The system also includes a data analyzer configured to generate an output based on the sensor data using a PNN. The system further includes an analyzer inspector configured to capture inspection data associated with the generation of the output by the data analyzer, and then generate an indication of reliability for the output using an INN, based on the inspection data. In the embodiments, the PNN is trained using a different set of training data from the training data set used to train the INN. In at least some embodiments, the sensor data comprises an image captured from a camera on an autonomous vehicle, and the navigator system of the autonomous vehicle uses the indication of reliability to navigate the vehicle.

In yet other embodiments disclosed herein, a training method for neural networks is described. The method includes providing a PNN configured to generate output from respective input data and an INN configured to receive inspection data associated with applications of the PNN and output a reliability metric for output of the PNN based at least in part on the inspection data. The method includes separating a set of input data for the PNN into a first data set, a second data set, and a third data set. The PNN is trained using the first data set. The INN is trained using a first inspection data set generated from applying the PNN to the second data set. The INN is then tested using a second inspection data set generated from applying the PNN to the third data set.

The reliability metrics generated using the embodiments disclosed herein are more accurate than reliability metrics calculated from mathematical functions. Importantly, the INN is a neural network that can be trained to recognize particular behaviors of the PNN during its inference process that are indicative of the reliability of its output. Further, the INN is not biased in favor of the PNN, because the INN is trained using different data than the PNN. Thus, the INN is capable of making an objective examination the inference process of the PNN. This objectivity makes the INN's reliability metric more accurate and useful in the real-world setting. These and other benefits and features of the inventive concepts are discussed in further detail below, in connection with the figures.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
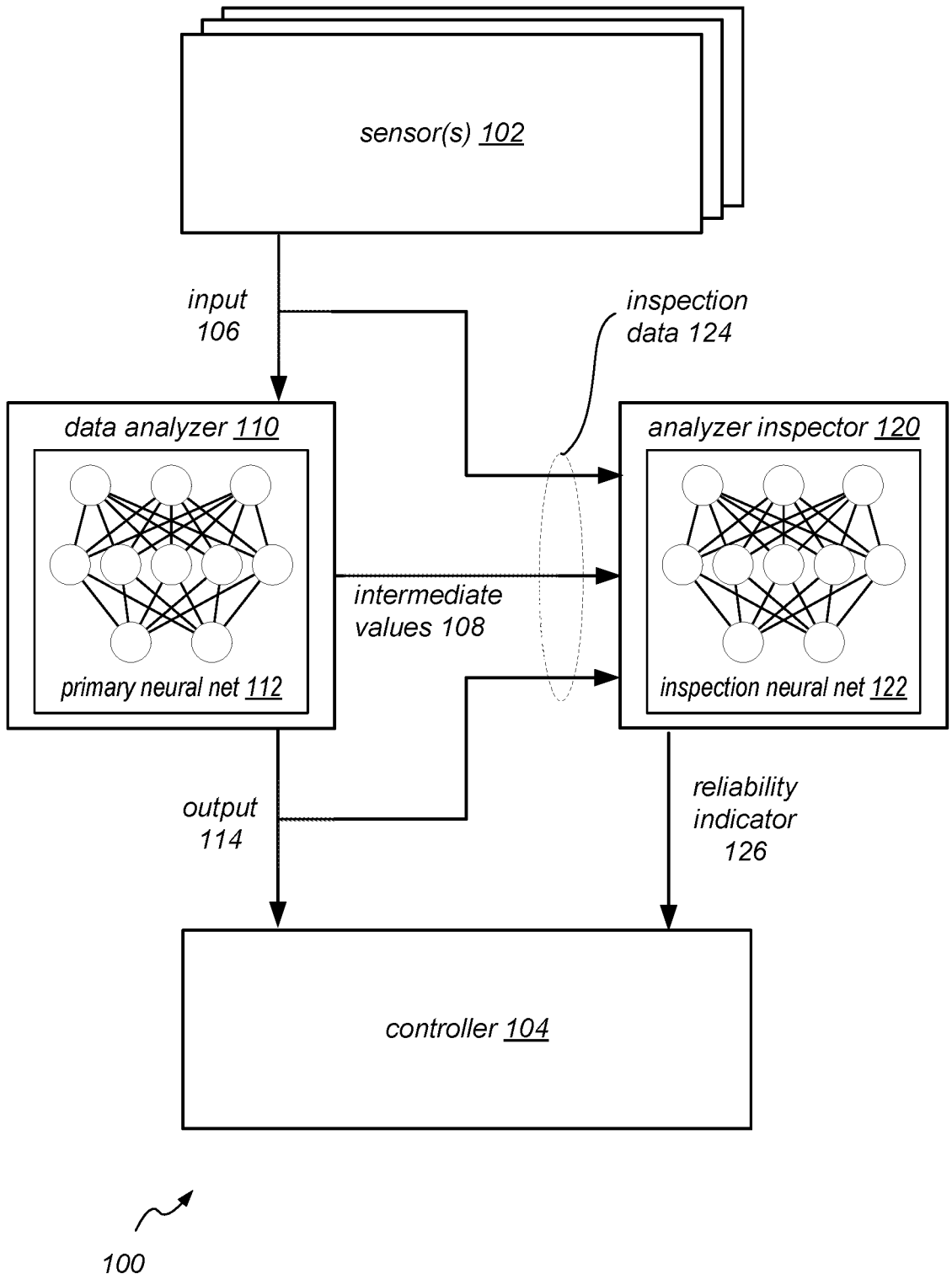
FIG. 1 is a block diagram illustrating one embodiment of a system using an inspection neural network to generate a reliability indicator, according to some embodiments disclosed herein.

FIG. 1 is a block diagram illustrating one embodiment of a system using an inspection neural network to generate a reliability indicator, according to some embodiments disclosed herein. As shown, system 100 includes sensor(s) 102, a data analyzer 110, an analyzer inspector 120, and a controller 104.

The sensors 102 may be any type of sensors capable of capturing and providing data as input 106 to the data analyzer 110. The sensors 102 may include for example different types of cameras, microphones, radar devices, light detection and ranging (LIDAR) devices, Global Positioning System (GPS) devices, thermometers, accelerometers, heart rate monitors, and the like. The sensors 102 may be able to capture sensor data at various sampling frequencies. Different sensors may be able to update their output in some embodiments, and as a result the rate at which the output is obtained at the data analyzer 110 may vary from one sensor to another. In addition to conventional video and/or still cameras, in some embodiment near-infrared cameras and/or depth cameras may be used. In some embodiments, one or more of the computing devices may also play the role of a sensor—e.g., metrics regarding the state or communications of a computing device may be collected via any appropriate communication protocol and provided as input 106 to the data analyzer 110.

The input 106 may be formatted as a data set appropriate for input to the data analyzer 110. In some embodiments, the input 106 may be transmitted over a network to the data analyzer 110. The network may encompass any suitable combination of networking hardware and protocols necessary to establish network-based communications between the sensors 102 and data analyzer 110. For example, the network may generally encompass the various telecommunications networks and service providers that collectively implement the Internet. The network may also include private networks such as local area networks (LANs) or wide area networks (WANs) as well as public or private wireless networks.

The data analyzer 110 may be implemented by a computer system including one or more computing devices capable of analyzing the input data 106. The data analyzer 110 may be implemented using a single server or a cluster of compute nodes connected in a network. The data analyzer 110 may include primary neural network (PNN) 112, which accepts the input 106 and generates and output 114.

Neural networks may comprise a data analysis system that comprises a collection of connected neurons that are designed to model the way the brain solves problems. Each neuron in the neural network may be connected to many other neurons, such that the output of one neuron may be received as the input of another neuron. Each neuron may have a summation function which combines the values of all its inputs together to generate an output. The connections may be parameterized to enhanced or inhibit the signals transmitted between the neurons. Neural networks may contain thousands or even million neuron and millions of connections.

A neural network is a type of self-learning system that can be programmatically trained to perform a task instead of being explicitly programmed. That is, the neural network is "programmed" by programmatically training the network using a set of training data with known solutions, or ground truths. During training, the neural network repeatedly compares its output for the input data with the ground truths associated with the input data, and slowly adjusts its parameters so that the network's output approaches the ground truths. In general terms, the training process strives to minimize the value of a loss function that measures the how far away a generated solution is from the ground truth solution.

As a second step, the neural network may be tested against a set of testing data that is different from the training data. During the second step, the parameters of the neural network may not change. Rather, the goal of the testing step is to verify the objective correctness of the neural network with a set of input data that it has not seen before. The testing step is generally performed with a different input data set from the training data set to ensure that the knowledge encapsulated in the network is transferrable to other data that was not the basis of the knowledge. The resulting neural network thus captures an analytical process that is trained to perform a particular analytical task, which may be difficult to express in a traditional computer program.

Like the data analyzer 110, the analyzer inspector 120 may be implemented by a computer system including one or more computing devices. The analyzer inspector 120 may be implemented using a single server or a cluster of compute nodes connected in a network. In some embodiments, the analyzer inspector 120 may be implemented on the same computing device as the data analyzer 110. In some embodiments, the analyzer inspector 120 and the data analyzer 110 may be implemented in the same software module. The analyzer inspector 120 may include an inspection neural network (INN) 122, which may accept as input inspection data 124 and generate a reliability indicator 126. The inspection data may be received via a network using a network protocol, or via an inter-process communications (IPC) facility. In cases where the analyzer inspector 120 and the data analyzer 110 are implemented in the same software module, the inspection data 124 may simply be shared data accessible in a common memory space of the two components.

As shown, the INN 122 is neural network that is separate from the PNN 112. The INN 122 may be trained using a set of training data that is distinct from the training data used to train the PNN 112. In practice, it is important that the INN 122 be trained using at least some training data set that is not used to training the PNN 112. The separate training means that the INN 122 will gain different knowledge than the PNN 112, and ensures a degree of independence between the two neural networks. If the PNN 112 and INN 122 are trained using the same data sets, the INN 122 may simply develop the same knowledge as the PNN 112. As a result, the INN 122 may not be able to readily recognize the shortcomings of PNN 112.

The inspection data 124 may include the input 106, the output 114, or any intermediate values 108 generated during one inference by the PNN 112. The intermediate values 108 may include for example values generated by a set of hidden neurons in the PNN 112 during the inference process. The intermediate values 108 may also include one or more side metrics generated by the PNN 112, for example a self-reported confidence value. The intermediate values 108 may also include metrics regarding the inference process that are captured by the analyzer inspector 120, for example, the number of times a particular neuron was exercised during the inference process. All of this information may be collectively provided to the analyzer inspector 120 as input data to the INN 122.

The reliability indicator 126 generated by the analyzer inspector 120 may be one or more values that indicate the reliability of the output 114 of the data analyzer 110. A low indicator of reliability may suggest that the output 114 is associated with a high degree of uncertainty or high probability of error. On the other hand, a high indicator of reliability may suggest the opposite. In a real-world operation setting where ground truth values may not be readily available, the reliability indicator 126 may be used as an approximation of the error of output 114.

Controller 104 may be may be implemented by a computer system including one or more computing devices. In some embodiments, the controller 104 may be mechanical or hydraulic device. The controller 104 may receive output 114 of the data analyzer 110 and the reliability indicator 126 generated by the analyzer inspector 120. The controller 104 may receive this information at a particular frequency. In some cases, each output 114 is accompanied by a reliability indicator 126. The output 114 and reliability indicator 126 may be received together. The output 114 and reliability indicator 126 may be received over a network, such as a LAN or a WAN such as the Internet. The controller 104 may monitor the output 114 and reliability indicator 126 and alter the operation conditions of a dynamic system under its control.

Using the components included in the system 100, the INN 122 may generate a reliability indicator 126 that is significantly more accurate than reliability metrics generated using conventional methods. First, because the INN 122 is itself a neural network, it is able to capture the full complexities of the inference process of the PNN 112. The INN 122 is able to take appropriate account of a variety of data associated with the inference process, including different types of intermediate values 108 generated by the PNN 112. Second, because the INN 122 is trained using at least some training data that is different from the training data for PNN 112, the INN 122 is able to inspect the performance of PNN 112 in an objective fashion. This approach thus avoids the inherent bias associated with neural networks that generates a self-reported reliability indicator.

It should be noted that although the system 100 includes a controller 104, some of the inventive concepts relating to the PNN 112 and INN 122 may be implemented in a system without a controller. For example, a PNN/INN may be used in data analysis system that generates its output for a user, as opposed to a controller. Moreover, the input data for the data analyzer 110 may be obtained from sources other than sensors 102. For example, the PNN/INN illustrated in FIG. 1 may be used in a financial analysis system, where the input data is received from a database. A person of ordinary skill would understand that the data analyzer 110, PNN 112, analyzer inspector 120, and INN 122 are components that may be implemented in a variety of data analysis systems. These systems may be implemented using numerous combinations of components to provide a variety of features, without departing from the spirit of the inventive concepts described herein.

Figure 2:
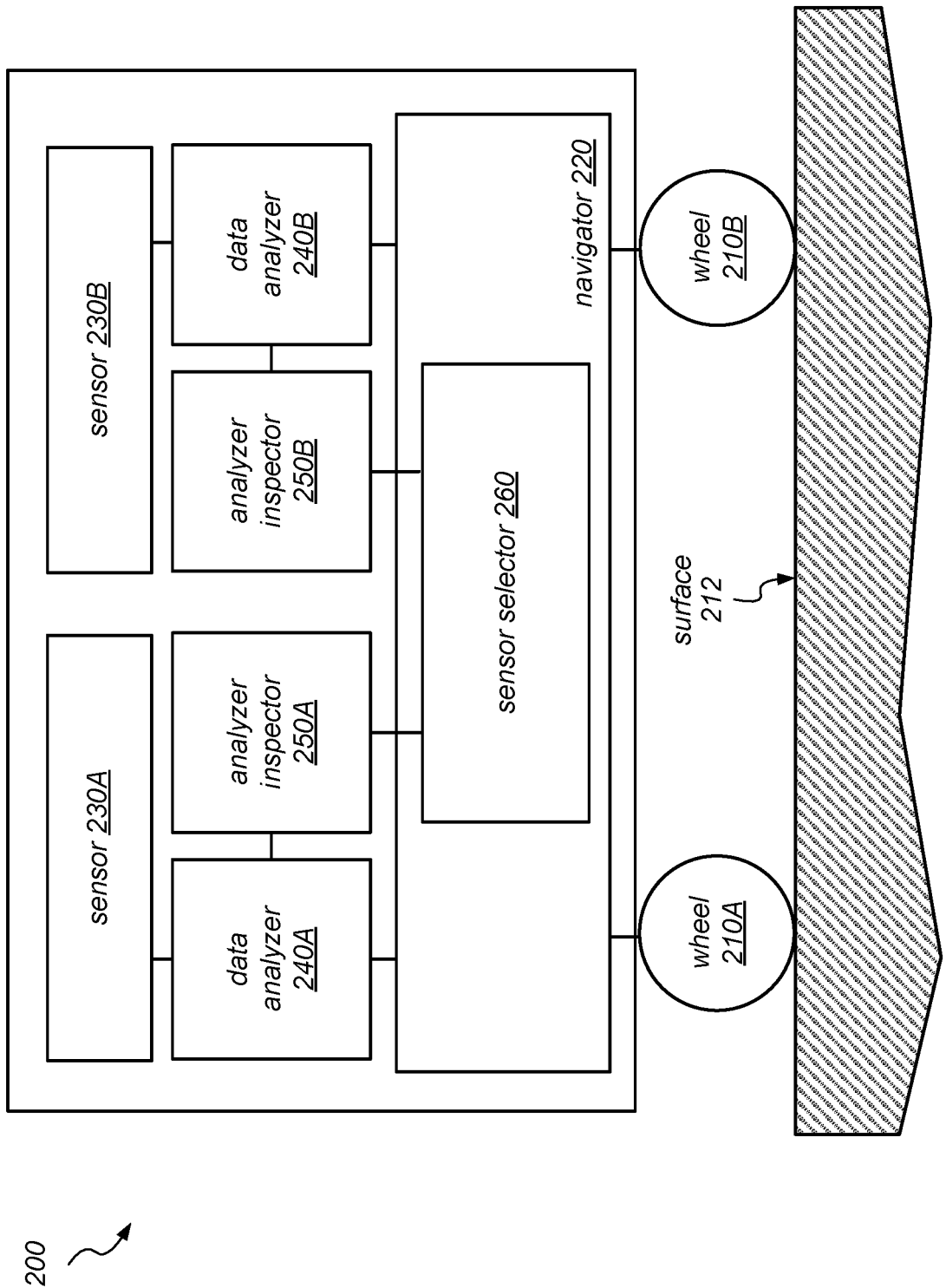
FIG. 2 is block diagram illustrating an autonomous vehicle that employs an inspection neural network, according to some embodiments disclosed herein.

FIG. 2 is block diagram illustrating an autonomous vehicle 200 that employs an inspection neural network, according to some embodiments disclosed herein. The data analysis system of FIG. 1 may be used within autonomous vehicles to analyze sensor data relating to roads. Images of roads may be captured via sensors on the vehicle and analyzed using the data analysis system including the data analyzer 110 and analyzer inspector 120 as depicted in FIG. 1 to determine drivable regions in the images. The output generated by the data analyzer 110 and analyzer inspector 120 may be provided to the vehicle's control system which control the movements of the vehicle 200. The term "autonomous vehicle" may be used broadly herein to refer to vehicles for which at least some motion-related decisions (e.g., whether to accelerate, slow down, change lanes, etc.) may be made, at least at some points in time, without direct input from the vehicle's occupants. In various embodiments, it may be possible for an occupant to override the decisions made by the vehicle's decision making components, or even disable the vehicle's decision making components at least temporarily. Furthermore, in at least one embodiment, a decision-making component of the vehicle may request or require an occupant to participate in making some decisions under certain conditions.

Autonomous vehicle 200 may include a plurality of sensors, such as sensors 230A and 230B. The sensors 230A and 230B may be used to capture data regarding the vehicle's surroundings, including the road that the vehicle 200 is traveling on. The vehicle 200 may include a plurality of these sensors, which may include for example different types of cameras, radar devices, light detection and ranging (LIDAR) devices, and the like. In one embodiment, sensors 230A and 230B comprise two different video cameras with different spectral ranges. The first camera may be optimized for daytime lighting conditions, while the second camera may be optimized for nighttime lighting conditions by focusing on ranges of non-visible light such as near-infrared or ultraviolet radiation. The sensors 230A and 230B may be able to capture road images at various sampling frequencies and output the images at various output frequencies to the data analyzers 240A and 240B, respectively.

The data analyzers 240A and 240B may receive the images from the sensors 230A and 230B and generate a corresponding confidence map of the images using primary neural networks, as discussed in connection with FIG. 1. The confidence map may comprise a plurality of units, each corresponding to an area on the image. For example, the confidence map may contain one unit for each pixel in the input image. Each unit in the confidence map may be associated with a confidence value indicating the probability that a given pixel in the image represents a drivable region. In one embodiment, the units in the confidence map may simply specify one of two values, indicating whether a given pixel in the image is or is not a drivable region. In other embodiments, the PNN of the analyzers may generate output other than a confidence map, depending on the task. For example, in some embodiments, the PNN may be configured to infer one or more classification of a subject in the image. Such classifications may include for example types of objects observed on the road such as other vehicles, pedestrians, lane markings, or traffic signs. In such embodiments, the PNN may generate one or more classification identifiers, rather than a confidence map. In any case, the output of the data analyzers 240A and 240B may be provided to the navigator 220, which uses the output to make navigation decisions.

In some embodiments, the data analyzers 240A and 240B may perform an object classification task on the images from the sensors and generate a class probability vector. The probability vector may indicate a class that has been inferred by the PNN for a detected object in the image. For example, the PNN may detect a road occluder object on the road, and classify the object by generating a probability vector indicating an occluder class type. The PNN may be modeled to classify road objects such as traffic signs, traffic lights, and the like.

Data analyzer 240A and 240B may be associated with a respective analyzer inspectors 250A and 250B. Analyzer inspectors 250A and 250B may operate to capture inspection data from the inference process of the data analyzers 240A and 240B respectively, and using an INN, generate a reliability indicator for the output of the inference process based on the inspection data. The inspection data may include the input to the PNN, the output from the PNN, some intermediate value generated during the inference process, or some combination thereof. For example, an INN in the analyzer inspector 250A or 250B may be able to determine from the input image that the image is too dark and generate a low reliability indicator based on the input data. In another example, the INN may determine from the output confidence map that the map is blurry and does not indicate clear segmentation of the image drivable and undrivable regions. Based on this determination, the INN may generate a low reliability indicator. As another example, the INN may determine that certain intermediate data generated during the inference process indicate that the confidence values of certain units in the confidence map were based on borderline input values that were close to certain decision boundaries. Again, such a determination may cause the INN to generate a low reliability indicator. The reliability indicator may be a binary value or a scalar value. In some embodiments, a plurality of reliability indicators may be generated for different aspects of the output or inference process. For example, different reliability indicators may be generated for different parts of the confidence map. As another example, different reliability indicators may be generated for the input data, the output data, or particular stages in inference process. The reliability indicator may be provided to the navigator 220 along with the output generated by the data analyzers 240A and 240B.

The navigator 220 of the vehicle 200 may be responsible for controlling the motion control subsystems of the vehicle 200, such as the braking system, acceleration system, turn controllers and the like may collectively be responsible for causing various types of movement changes of vehicle 200 via wheels 210A and 210 B contacting a road surface 212. In the navigator 220, a motion selector may be responsible for issuing relatively fine-grained motion control directives to various motion control subsystems. In some embodiments, the motion selector may issue one or more directives approximately every 40 milliseconds, which corresponds to an operating frequency of about 25 Hertz for the motion selector. Of course, under some driving conditions (e.g., when a cruise control feature of the vehicle is in use on a straight highway with minimal traffic) directives to change the trajectory may not have to be provided to the motion control subsystems at some points in time. For example, if the navigator 220 determines to maintain the current velocity of the vehicle 200, and no new directives are needed to maintain the current velocity, the motion selector may not issue new directives.

The navigator 220 may use the output received from the data analyzers 240A and 240B and the reliability indicators received from the analyzer inspectors 250A and 250B to make decisions about vehicle movements. For example, the output from data analyzers 240A and 240B may indicate a confidence map of drivable regions in an image that represents the frontal view of the vehicle 200. The navigator may receive repeated confidence maps from the data analyzers 240A and 240B and use the confidence maps to determine the direction of the road as the vehicle 200 moves forward. The reliability indicators generated by the analyzer inspectors 250A and 250B may be used in a number of ways. In one example, if the indicator falls below a threshold, the navigator 220 may simply ignore the accompanying output. Where the output comprises confidence maps of drivable regions, the navigator 220 may ignore the particular confidence map and wait for the next confidence map. In some cases, the navigator 220 may cause the vehicle to slow down until it begins to receive confidence maps with better reliability indicators. In another example, the navigator 220 may determine that the confidence maps provided by the two data analyzers 240A and 240B are in conflict. In that case, the navigator 220 may use the respective reliability indicators as a tie breaker as to which confidence map to use, or a weight to generate a weighted sum of the two confidence maps.

In yet another example, the reliability indicators for different sensors 102A and 120B may be submitted to a sensor selector 260. The sensor selection 260 may be implemented as a part of the navigator 220, or a separate component from the navigator 220. The sensor selection 260 may monitor the successive reliability indicators of each of the sensors, and determine that one sensor has become unreliable under current conditions. For example, sensor 230A may comprise a daytime camera that does not work well under nighttime lighting conditions. The sensor selector 260 may determine, based on the reliability indicators from analyzer inspector 250A that recent confidence maps generated from sensor 230A are unreliable. On the other hand, sensor 230B may be a nighttime camera that operates better under nighttime lighting conditions. Sensor selector 260 may determine based on the reliability indicators from 250B that sensor 230B is currently generating highly reliable confidence maps. Under these circumstances, the sensor selector 260 may switch from sensor 230A to sensor 230B to be used as the primary sensor for the navigator 220.

In general, the reliability indicator generated by analyzer inspectors 250A and 250B may be used by the navigator 220 in a variety of ways. A person of ordinary skill would understand that the inventive concepts disclosed herein are not limited by the particular manner in which the reliability indicators are used.

Figure 3:
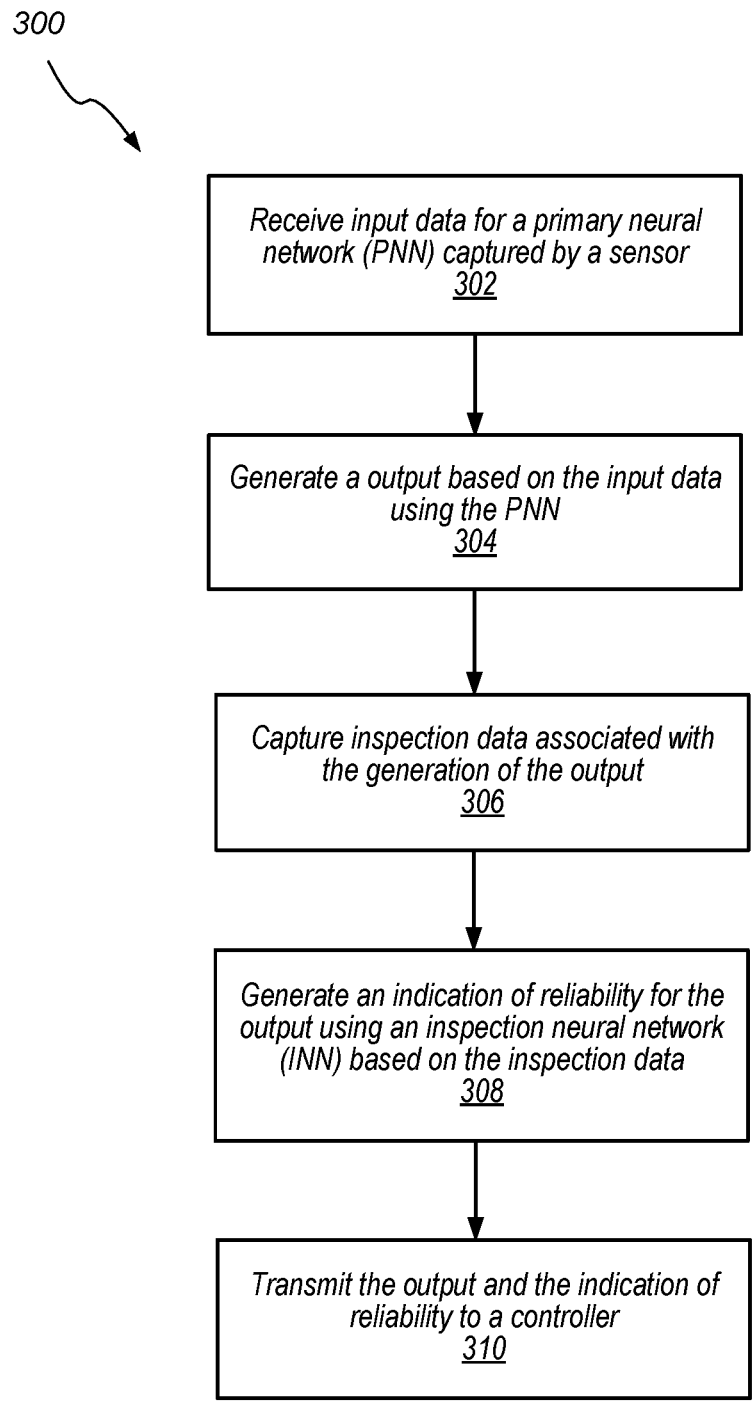
FIG. 3 is a flow diagram illustrating a process of generating a reliability indicator using an inspection neural network, according to some embodiments disclosed herein.

FIG. 3 is a flow diagram illustrating a process of generating a reliability indicator using an inspection neural network, according to some embodiments disclosed herein. Process 300 begins at operation 302. In operation 302, input data for a primary neural network (PNN) captured by a sensor is received. The sensor may comprise one or more of the sensor(s) 102, as discussed in connection with FIG. 1. Operation 302 may be performed by the data analyzer 110, as discussed in connection with FIG. 1. The input data may be received in a variety of ways, for example over an internal data bus of a computer system, over a network such as a LAN or WAN, via one or more messages between two software modules, or via a shared memory.

At operation 304, an output based on the input data is generated using the PNN. Operation 304 may be performed by the data analyzer 110 as discussed in connection with FIG. 1. The output may be generated by providing the input data to the PNN. The PNN may be a neural network that has been trained to analyze the input data, as discussed in connection with FIG. 1. As one example, the PNN may be trained to analyze road images to determine drivable regions in the images.

At operation 306, inspection data associated with the generation of the output is captured. Operation 306 may be performed by the analyzer inspector 120, as discussed in connection with FIG. 1. The inspection data may include the input data to the PNN, the output generated by the PNN, intermediate data generated during the interference process of the PNN, or a combination thereof. As one example, intermediate values outputted by hidden neurons in the PNN may be captured as inspection data and used by the analyzer inspector 120 to generate the reliability indicator.

At operation 308, an indication of reliability for the output is generated using an inspection neural network (INN) based on the inspection data. Operation 308 may be performed by the analyzer inspector 120, as discussed in connection with FIG. 1. As discussed, the INN may be a neural network that is trained using a set of training data that is distinct from the training data used to train the PNN. This separation of training data ensures the independence of the INN from the PNN and reduces the risk of bias that may result when the two networks are training using the same training data. The indication of reliability may be a value that approximates he probability or magnitude of error associated with the output produced by the PNN. In some cases, the indication of reliability may simply be a binary value indicating whether the output is or is not reliable.

At operation 310, the output and the indication of reliability are transmitted to a controller. Operation 310 may be performed by the data analyzer 110 and/or the analyzer inspector 120, as discussed in connection with FIG. 1. As discussed, each output produced by the data analyzer 110 may be accompanied by a reliability indicator from the analyzer inspector 120. The two results may be transmitted to the controller together. The results may be transmitted over an internal data bus of a computer system, over a network such as a LAN or WAN, via one or more messages between two software modules, or via a shared memory. The controller may be any type of controller that is configured to monitor the output and reliability indicator and alter the operation conditions of a dynamic system based on these results, as discussed in connection with FIG. 1.

Figure 4:
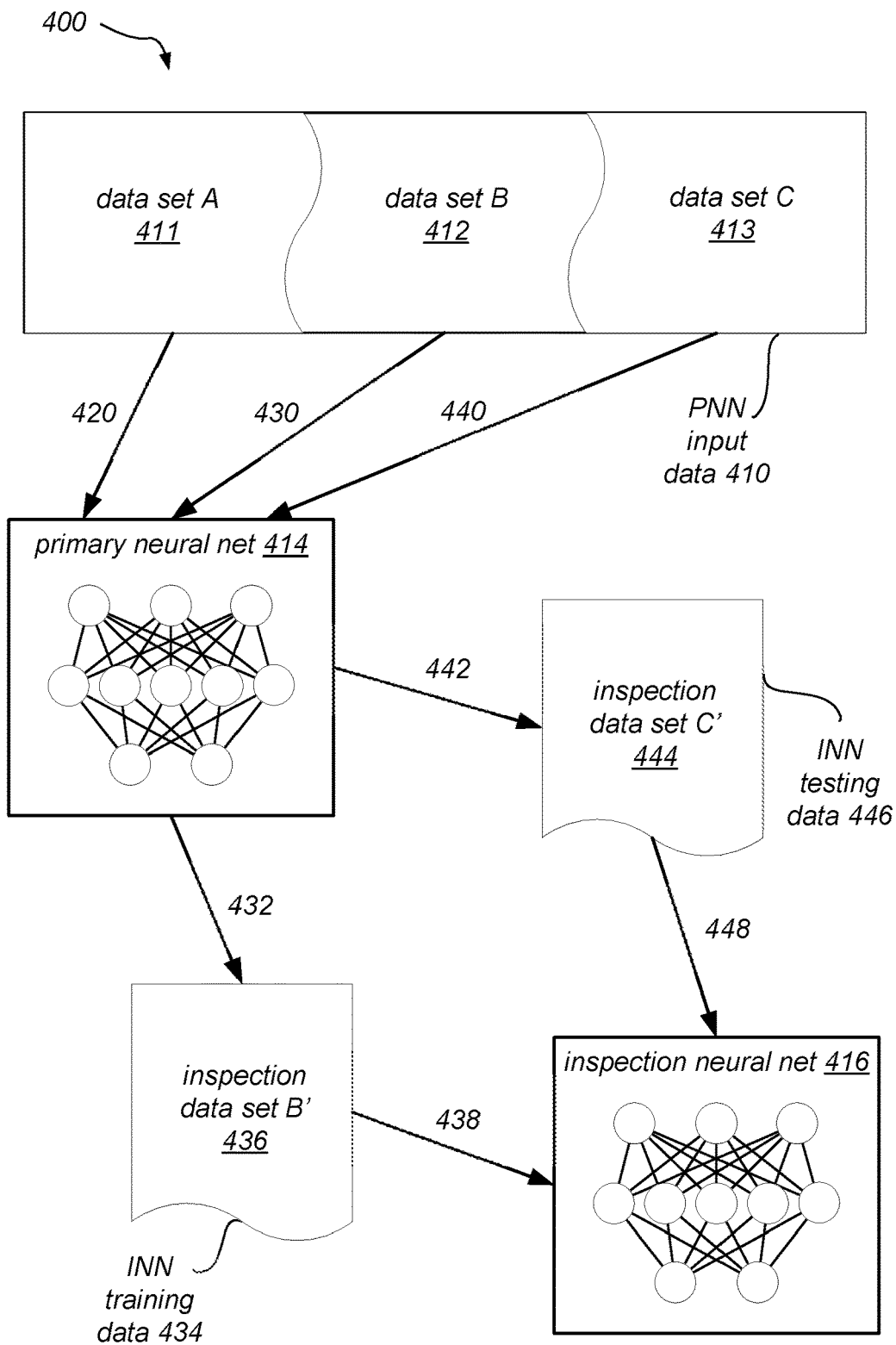
FIG. 4 is a diagram illustrating a process of training an inspection neural network, according to some embodiments disclosed herein.

FIG. 4 is a diagram illustrating a process of training an inspection neural network, according to some embodiments disclosed herein. In particular, FIG. 4 depicts a process wherein the initial training data set is divided into three subsets A, B, and C. Subset A is used to train the PNN, and subset B is used to generate training data for the INN.

The approach shown in FIG. 4 is designed to overcome the problem of bias that may arise when the PNN and the INN are trained using the same training data. An analogy may be drawn between the situation here and that of a student and a grader. The student may study for a test by taking practice tests. Through the studying, the student may gain some knowledge about the test subject matter. At the same time, the grader may go through training to learn to grade the student's test answers without looking at the answer key. In this setting, if the grader only trains using the student's practice tests, she may develop a bias toward the student's way of thinking. This is because the grader's training only provided the grader with the same knowledge about the test subject matter as what was provided to the student. The grader thus learns to solve problems in the same way as the student, and remains blind to the potential pitfalls of the student's problem solving approach. Such a grader will tend to grade the student more favorably based on student's test taking data alone. Thus, in practice, it is important that the grader is trained using at least some training data sets that are distinct from the data sets used to train the student.

As shown in FIG. 4, an initial PNN input data set 410 is divided into three subsets, data set A 411, data set B 412, and data set C 413. These data sets may be associated ground truth labels that can be used to assess the performance of the PNN 414 during the training process. For example, the training process may assess the performance of the PNN 414 based on a loss function that indicates the different between the ground truths for a test case and the PNN's inference output for that same test case. In a first stage of the training process, at operation 420, the PNN 414 may be trained using just data set A 411. During this process, the parameters of the PNN 414 may be slowly adjusted to minimize the loss function. However, data sets B 412 and C 413 are not used to adjust the parameters of PNN 414.

In a second training stage, the INN 416 is trained using a set of inspection data 436 generated from data set B 412. The second stage may include operations and/or data sets 412, 430, 432, 434/436, and 438 in FIG. 4. At operation 430, data set B 412 is provided to the trained PNN 414 to generate 432 an inspection data set B' 436. The inspection data set 436 may include the input data set B 412, the output of PNN 414 for data set B 412, any intermediate values associated with the inference process of PNN 414 in producing the output, or any combination thereof. The inspection data set 436 may include a set of data concerning the inference process of PNN 414 that may be indicative of the reliability of the output.

At operation 438, the inspection data set 436 is used as an INN training data set 434 for the INN 416. The INN 416 may produce a reliability indicator that is an approximation of the error of the PNN 414's output. The approximate error may be compared with the actual error of the output, which may be computed from the PNN's output for the data set B 412 and the ground truth labels associated with data set B 412. The training of the INN 416 may employ a loss function that captures the difference between its output, the approximation of PNN's error, and the actual error. The training of the INN 416 may slowly adjust the parameters of INN 416 to minimize the loss functions. During the training of the INN 416, the PNN 414 does not train. Thus, the PNN 414 and INN 416 are trained using distinct training data sets, and the two networks do not learn the same knowledge. Rather, the INN 416 is trained to recognize the problems of the PNN 414.

In a third training stage, the INN 416 is tested using a set of inspection data 444 generated from data set C 413. The third stage may include operations and/or data sets 413, 442, 444/446, and 448. At operation 440, data set C 413 is provided to the trained PNN 414 to generate 442 an inspection data set C' 444. The inspection data set 444 may include the input data set C 413, the output of PNN 414 for data set C 413, any intermediate values associated with the inference process of PNN 414 in producing the output, or any combination thereof. The inspection data set 444 may a set of data concerning the inference process of PNN 414 that may be indicative of the reliability of the output.

At operation 448, the inspection data set 444 is used as an INN testing data set 446 for the trained INN 416. As in the second stage, the INN 416 may produce a reliability indicator that is an approximation of the error of the PNN 414's output, and that approximate error may be compared with the actual error of the output, which may be computed using the ground truth labels associated with data set C 413. However, the INN 416 is not adjusted during this third stage. Rather, the third stage simply verifies the correctness of the trained INN 416. In some embodiments, the training process may dispense with a separate testing stage for the PNN 414. This is because building and testing of INN 416 represents an implicit verification of the performance of the PNN 414. Further, since the PNN 414 and INN 416 will be deployed to the field together as a pair, it is the objective correctness of both networks, rather than just the PNN 414, that will be the more important measure of correctness.

Figure 5:
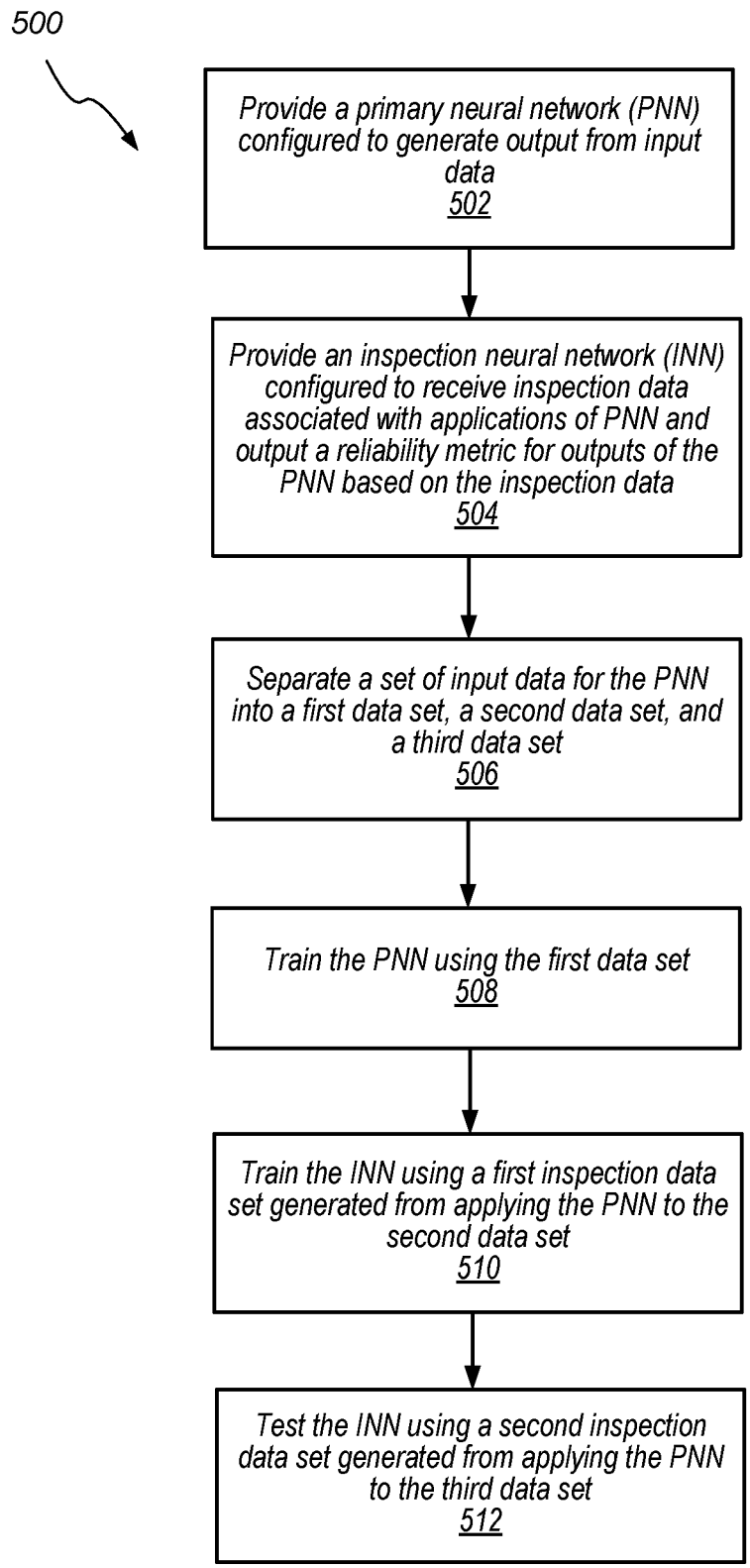
FIG. 5 is flow diagram illustrating a process of training an inspection neural network, according to some embodiments disclosed herein.

FIG. 5 is flow diagram illustrating a process of training an inspection neural network, according to some embodiments disclosed herein. Process 500 begins at operation 502, where a primary neural network (PNN) is provided and configured to generate output from input data. The PNN may be PNN 414 as discussed on connection with FIG. 4. The PNN may be an untrained neural network.

At operation 504, an inspection neural network (INN) is provided and configured to receive inspection data associated with applications of the PNN and output a reliability metric for outputs of the PNN based on the inspection data. The INN may be INN 416 as discussed in connection with FIG. 4. The INN may be an untrained neural network. As discussed, the INN may be configured to evaluate the inference process of the PNN, using captured inspection data, which may include the input to the PNN, the output produced by the PNN, or any intermediate value associated with the inference process to generate the output.

At operation 506, a set of input data for the PNN may be separated into a first data set, a second data set, and a third data set. The set of input data for the PNN may be the PNN input data set 410 in FIG. 4. The first, second, and third data sets may be data sets A 411, B 412, and C 413 in FIG. 4, respectively. In some embodiments, the relative sizes of the first and second data sets may be selected based on the relative sizes of the PNN and the INN. Thus, a network with a larger number of neurons will be assigned a proportionally larger training data set. In some embodiments, the third data set, which is used to test the combined results of PNN and INN, may be select such that it is approximately 20-30% of the combined size of the first and second data sets.

At operation 508, the PNN is trained using the first data set. Operation 508 may be performed in a similar fashion as operation 420 in FIG. 4. During this operation, parameters of the PNN may be adjusted to minimize a loss function, which may be selected to indicate the difference between the PNN's individual outputs and the corresponding ground truth labels in the first data set. The second and third data sets are not used to adjust the parameters of the PNN.

At operation 510, the INN is trained using a first inspection data set that is generated from applying the PNN to the second data set. Operation 510 may be performed in similar fashion as the second stage described in connection with FIG. 4, which includes elements 412, 430, 432, 434/436, and 438 of FIG. 4. During this process, parameters of the INN may be adjusted to minimize a second loss function that indicates the different between the reliability metric generated by the INN under training and the actual error of the outputs produced by the PNN. The second data set is not used to adjust the parameters of the PNN.

At operation 512, the INN is tested using a second inspection data set that is generated from applying the PNN to the third data set. Operation 512 may be performed in similar fashion as the third stage described in connection with FIG. 4, which includes elements 413, 440, 442, 444/ 446 and 448 of FIG. 4. During this process, the parameters of the INN are held constant. The second inspection data set is used to verify that the results generated by the trained INN, i.e., the reliability metrics, are sufficiently accurate when compared to the actual errors computed using the ground truth labels associated with the third data set.

Figure 6:
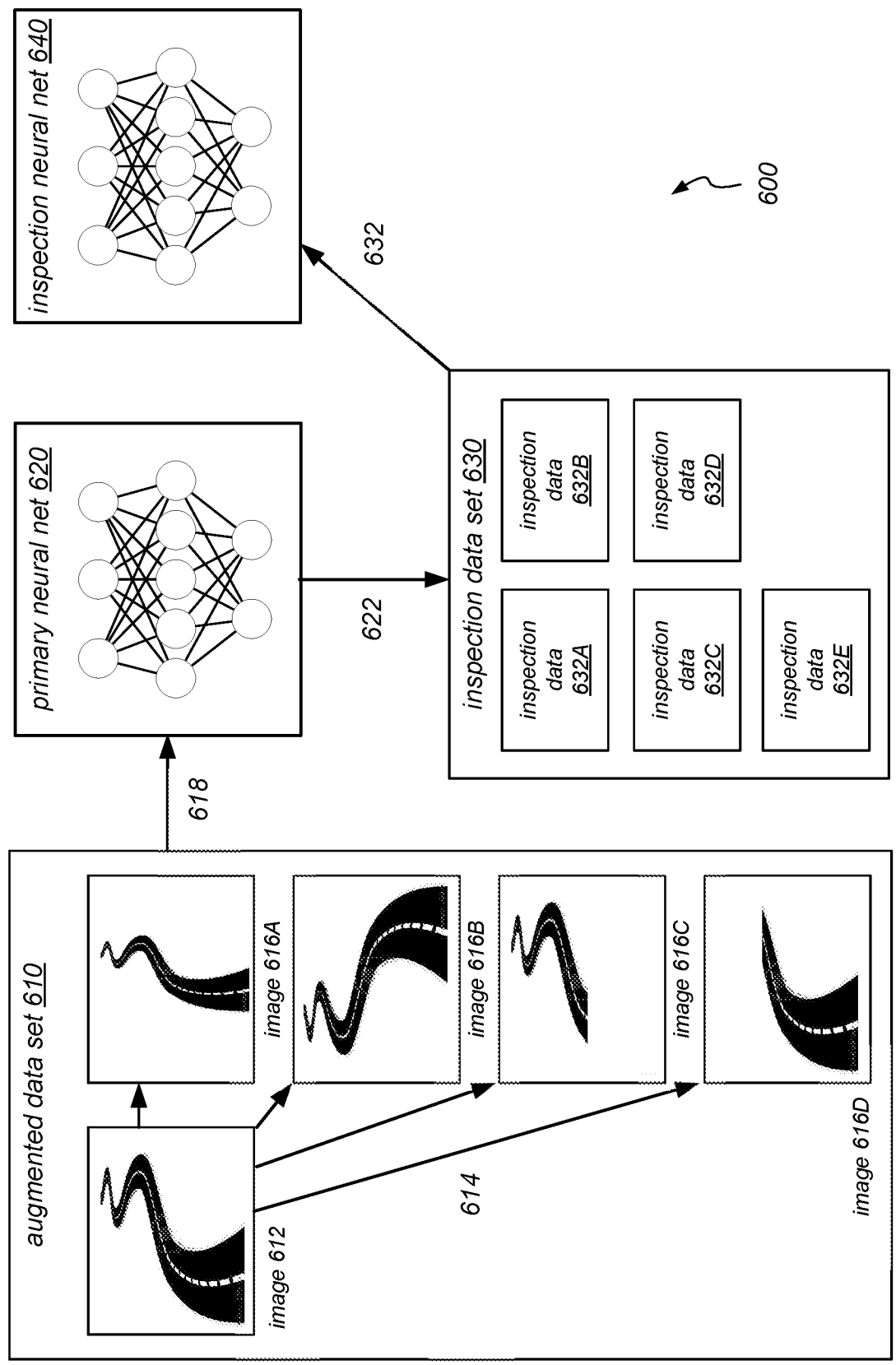
FIG. 6 is a diagram illustrating a process of augmenting a data set used to train an inspection neural network, according to some embodiments disclosed herein.

FIG. 6 is a diagram illustrating a process of augmenting a data set used to train an inspection neural network, according to some embodiments disclosed herein. Data augmentation refers to the application of one or more deformations to a collection of training samples to generate additional training data. Useful deformations for data augmentation do not change the semantic meaning of ground truth labels associated with the training data. For example, where the training data comprise images, translations, flipping, or scaling the image generally may be used as data augmentation techniques because they do not change the semantic meaning of subjects in the image. For example, a scaled image of a car would still be a coherent image of a car. Thus, for the training of neural networks analyzing images, augmented training data sets may be generated by randomly translations, flipping, or scaling the images in the initial training data set.

When training INNs, which receive inspection data as input, traditional data augmentation techniques may not always be useful. For example, although the input data to a PNN may be an image that can be augmented with image augmentation techniques, the inspection data provided to the INN may not be in the form of an image and thus may not be augmented using image augmentation techniques. However, the training data set for the INN may still be augmented indirectly by augmenting the training data set for the PNN, which in turn results in a larger set of inspection data for the INN.

The data augmentation technique is illustrated in FIG. 6. As illustrated in FIG. 6, the process begins by generating an augmented data set 610 for the PNN 620. The augmented data set 610 may be generated by randomly applying a selection of deformations to the training samples in the training data set. For example, if the original data set comprises road images, such as image 612, the augmented data set may be generated by randomly scaling, flipper, or cropping the samples in the training data set. As shown in FIG. 6, a test image 612 is augmented via operation 614 to produce image 616A, which is a scaled version of image 612. In some embodiments, the aspect ratio of the original image may be changed in multiple directions, while still preserving the semantic meaning of the original image. Image 616B is a flipped or mirrored version of the original image. In some embodiments, the original image may be flipped about a different axis, such as the X-axis or a diagonal axis. Images 616C and 616D are produced by randomly cropping the original image 612. All of the images in the augmented data set 610 are coherent images of roads, and thus they are suitable test images for the PNN 620.

At operation 618, the augmented data set 610 may be provided to the PNN 620. This in turn generates, at operation 622, an augmented inspection data set 630. The augmented inspection data set 630 may contain inspection data samples 632A-E, which corresponds to samples in the augmented data set 610 used as input to the PNN 620. In this manner, the training data set, i.e., the inspection data set 630, may be augmented, even where there are no obvious augmentation techniques to increase the deform the inspection data samples directly.

The data augmentation techniques describe above may be generalized in the following algorithm:

Data: Training data and labels
Result: The trained baseline network: pnn, Inspection neural network: inn
split training data into three portions: set_pnn, set_inn, and set_test -continued

```
while pnn has not achieved required performance do
    improve data augmentation techniques
    improve pnn architecture
    retrain pnn with augmented set_pnn
end
apply trained pnn to set_inn, set_test to form set_inn_train,
set_inn_test
use set_inn_train to train inn
while inn has not achieved required performance do
    augment set_inn
    apply pnn to set_inn to form set_inn_aug
    append set_inn_aug to set_inn_train
    improve data augmentation techniques
    improve inn architecture
    retrain inn with set_inn_train
end
test inn performance with set_inn_test
```

As shown, the algorithm first separates the training data into three subsets set_pnn, set_inn, and set_test, which corresponds to data sets A, B, and C in FIG. 4. The algorithm then proceeds through two loops. In the first loop the PNN is repeatedly trained using set_pnn. During each iteration of the first loop, the algorithm continues to improve the data augmentation techniques used to augment set_pnn. The architecture of the PNN may also be modified in each loop iteration. This may comprise modifying the neurons or the connections in the PNN to improve PNN performance. The first loop ends when it is determined that the PNN has achieved adequate performance.

In the second loop, the INN is repeatedly trained using set_inn_train, which is obtained by applying PNN to set_inn. In each iteration of the loop, the set_inn is first augmented using augmentation techniques for training data for the PNN. The PNN is then applied to the augmented set_inn to produce a set_inn_aug, which is then appended to set_inn_train. Thus, the algorithm augments the training data set of the INN in two ways. First, set_inn_train includes additional training samples that are generated as a result of the augmentation of set_inn. Second, because the augmentation techniques are being adjusted at each iteration of the loop, the input data set to the PNN may change from iteration to iteration, generating more inspection data for the INN. The set_inn_train aggregates the different set_inn_aug that are produced from the different input data sets to the PNN at each iteration, and creates a master set of training data to be used to train the INN. This approach quickly generates a large volume of inspection data from a relative small original set of input data set_inn. A larger set of inspection data leads to better taiing for the INN. As a final step of the algorithm, the trained INN is tested with set_inn_test to verify its correctness.

Figure 7A:
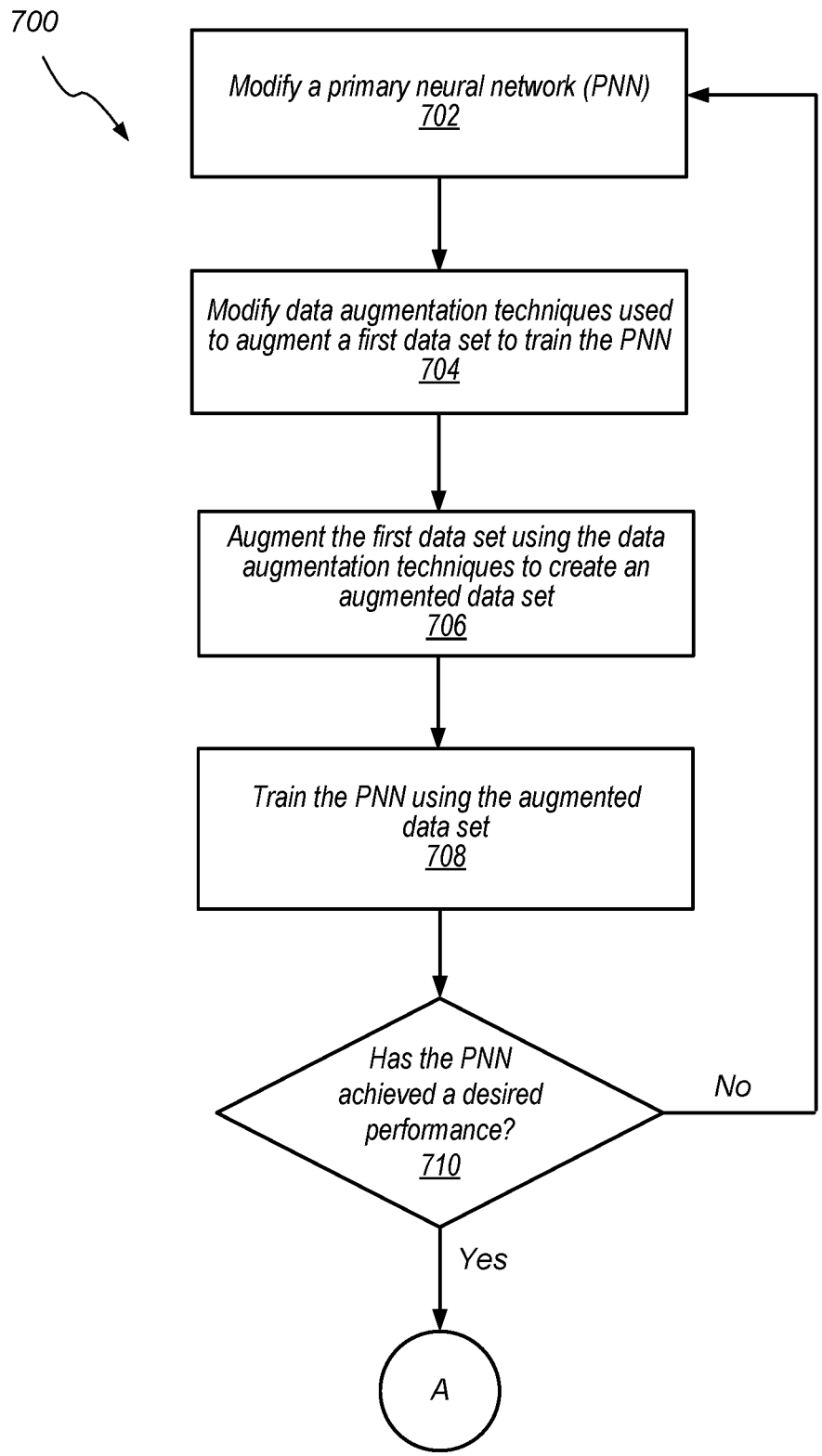
FIGS. 7A and 7B is flow diagram illustrating a process of training a primary neural network and an inspection neural network, according to some embodiments disclosed herein.
Figure 7B:
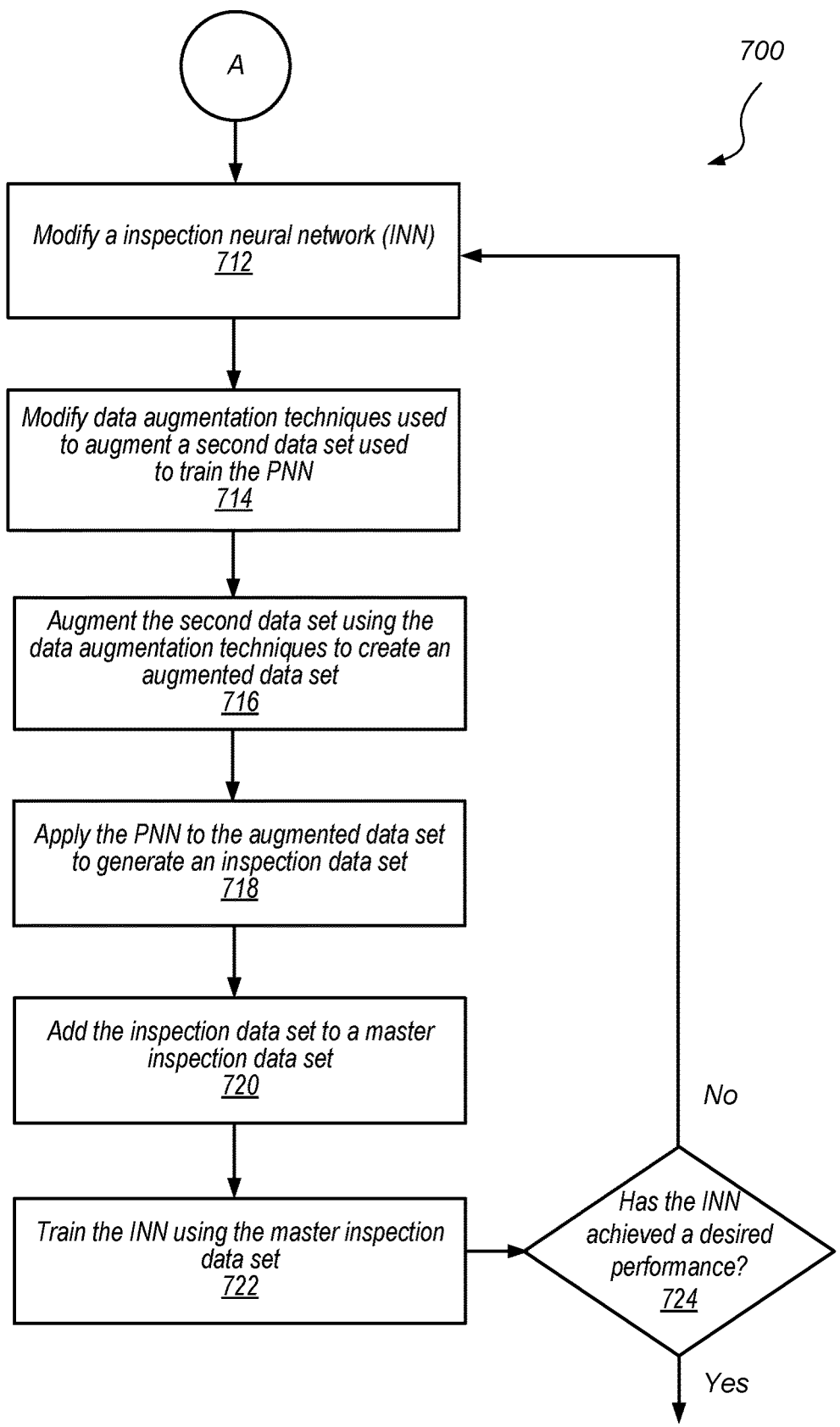

FIGS. 7A and 7B is flow diagram illustrating a process of training a primary neural network and an inspection neural network, according to some embodiments disclosed herein. The process depicted in FIGS. 7A and 7B may be an addition or refinement to the process 500 of FIG. 5. FIG. 7A corresponds roughly to the first loop of the algorithm described above, while FIG. 7B corresponds roughly to the second loop of the algorithm describe above.

Process 700 begins at operation 702. Operations 702, 704, 706, 708, and 710 may be operations performed in an iteration of a loop. At operation 702, a primary neural network (PNN) is modified. The modification may be an incremental improvement made the PNN during the training process. For example, the PNN may be updated to change the number of neurons in the PNN or the connections between the neurons.

At operation 704, data augmentation techniques used to augment a first data set to train the PNN is modified. The augmentation techniques may vary based on the type of input data that the PNN accepts. For example, if the input data to the PNN are images, the augmentation techniques may include deformations of the images such as scaling, flipping, or cropping of the images. At each iteration of the loop, new data augmentation techniques may be used to generation additional varieties of training data for the PNN. In some cases, new augmentation techniques may be chosen in a pseudorandom fashion. In some cases, the new augmentation techniques may be chosen so that more difficult training data samples are generated.

At operation 706, the first data set is augmented using the data augmentation techniques to create an augmented data set. For example, in a training data set that includes n images, each image may be deformed in four ways to generate an augmented data set of 5×n. At operation 708, the PNN is trained using the augmented data set.

At operation 710, a determination is made whether the PNN has achieved a desired performance. The determination may be made in a number of ways. In some embodiments, the training may involve comparing each output of the PNN with ground truth labels of each test sample and generating an adjustment to the PNN's parameters based on the comparison. In some embodiments, the new parameters may be backpropagated through the PNN. In such embodiments, the training process may monitor the magnitude of the parameter adjustments as the training progresses. When it is determined that the PNN's parameters have converged to reasonably stable values, the PNN may be deemed to have achieved a desired performance. If desired performance is achieved, the training of the PNN is finished and process 700 exits from the first loop to proceed to operation 712 in FIG. 7B. Otherwise, the process 700 repeats another iteration of the first loop.

Turning to FIG. 7B, operations 712, 714, 716, 718, 720, 722, and 724 may be operations performed in an iteration of a second loop. At operation 712, an inspection neural network (INN) is modified. Similar operation 702, the modification may be an incremental improvement made the INN during the training process. For example, the INN may be updated to change the number of neurons in the INN or the connections between the neurons.

At operation 714, data augmentation techniques used to augment a second data set used to train the PNN is modified. Operation 714 is similar to operation 704. However, in operation 714, rather than modifying the data augmentation techniques for training data for the INN, what is modified is the data augmentation techniques for the input data for the PNN. An augmented input data set for the PNN results in an augmented training data set for the INN.

At operation 716, the second data set is augmented using the data augmentation techniques to create an augmented data set. Operation 716 may be performed in a similar fashion as operation 706.

At operation 718, the PNN is applied to the augmented data set to generate an inspection data set. As discussed, the inspection data set may comprise data associated with the inference process of the PNN, and may include the input data to the PNN, the output of the PNN, or certain intermediate values associated with the inference process. This inspection data is used by the INN to evaluate the reliability of the output produced by the PNN.

At operation 720, the inspection data set is added to a master inspection data set. At each iteration of the loop in FIG. 7B, data augmentation techniques for the input data to the PNN changes. For example, at each iteration, new data augmentation techniques may be selected in a pseudorandom fashion. This means that at each iteration, the PNN is applied to new input data, and the inspection data generated from these runs are different from the inspection data generated in previous iterations. Thus, all of the inspection data generated from all iterations are aggregated in a master inspection data set used to INN. At operation 722, the INN is trained using the master inspection data set.

At operation 724, a determination is made whether the INN has achieved a desired performance. Operation 724 may be performed in a similar fashion as operation 710. For example, the INN may be deemed to have achieved satisfactory performance when the parameters of the INN converge to reasonably stable values. If desired performance is achieved, the training of the INN is finished and process 700 exits from the second loop to proceed to next operations of the training process. For example, the process may next test the trained INN using a test data set. Otherwise, the process 700 repeats another iteration of the second loop, as indicated by the back arrow in FIG. 7B.

Figure 8:
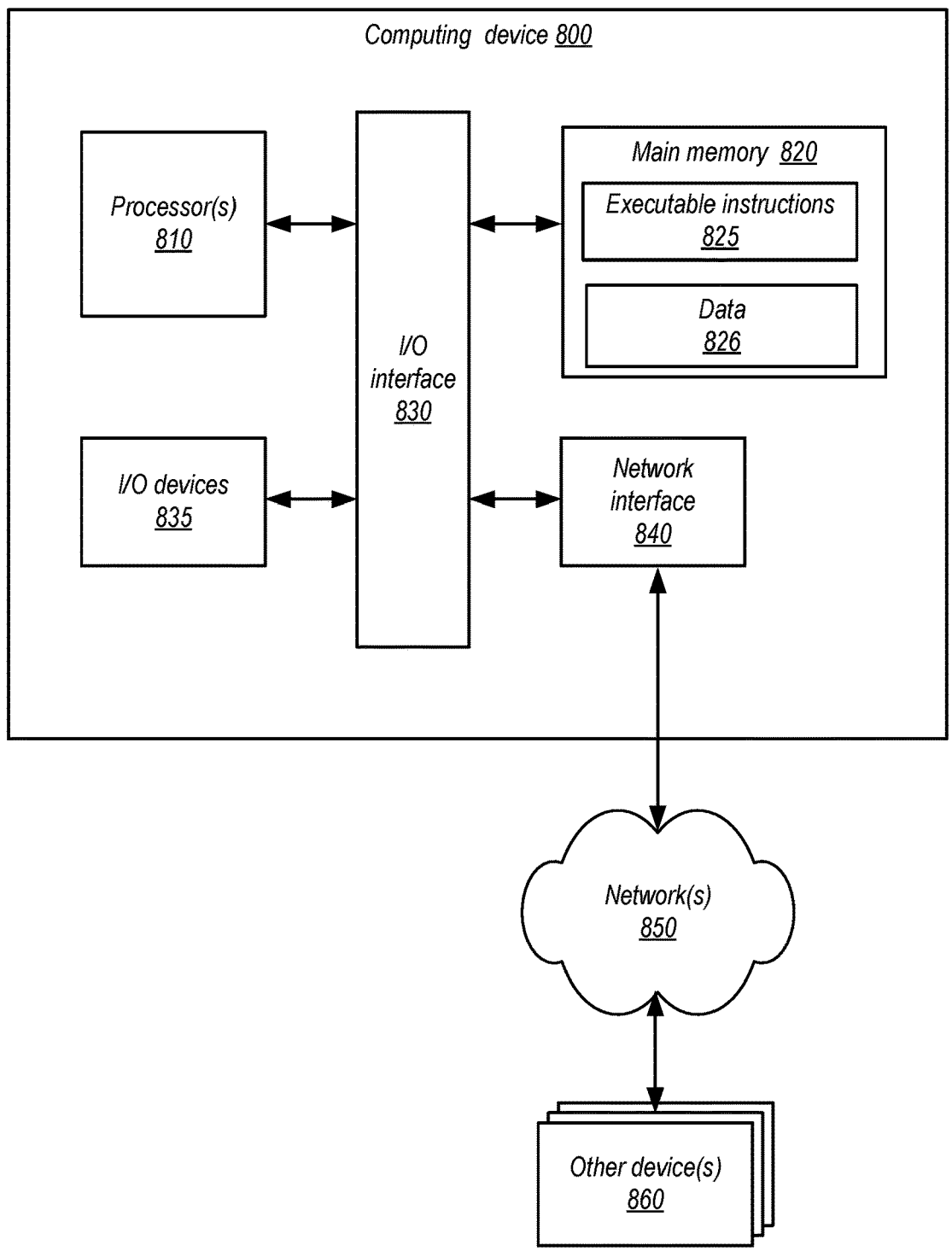
FIG. 8 is block diagram illustrating a computer system that may be used to implement a system using an inspection neural network, according to some embodiments disclosed herein.

In at least some embodiments, a system and/or server that implements a portion or all of one or more of the methods and/or techniques described herein, including the techniques to refine synthetic images, to train and execute machine learning algorithms including neural network algorithms, and the like, may include a general-purpose computer system that includes or is configured to access one or more computer-accessible media. FIG. 8 illustrates such a general-purpose computing device 800. In the illustrated embodiment, computing device 800 includes one or more processors 810 coupled to a main memory 820 (which may comprise both non-volatile and volatile memory modules, and may also be referred to as system memory) via an input/output (I/O) interface 830. Computing device 800 further includes a network interface 840 coupled to I/O interface 830, as well as additional I/O devices 835 which may include sensors of various types.

In various embodiments, computing device 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. In some implementations, graphics processing units (GPUs) may be used instead of, or in addition to, conventional processors.

Memory 820 may be configured to store instructions and data accessible by processor(s) 810. In at least some embodiments, the memory 820 may comprise both volatile and non-volatile portions; in other embodiments, only volatile memory may be used. In various embodiments, the volatile portion of system memory 820 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 825 and data 1926 implementing one or more desired functions, such as those methods, techniques, and data described above, are shown stored within main memory 820.

In one embodiment, I/O interface 830 may be configured to coordinate I/O traffic between processor 810, main memory 820, and various peripheral devices, including network interface 840 or other peripheral interfaces such as various types of persistent and/or volatile storage devices, sensor devices, etc. In some embodiments, I/O interface 830 may perform any necessary protocol, timing or other data transformations to convert data signals from one component (e.g., main memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to memory 820, may be incorporated directly into processor 810.

Network interface 840 may be configured to allow data to be exchanged between computing device 800 and other devices 860 attached to a network or networks 850, such as other computer systems or devices as illustrated in FIG. 1 through FIG. 10, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, main memory 820 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Various embodiments may further include receiving, sending or storing instructions and/or data implemented in accordance with the foregoing description upon a computer-accessible medium. Generally speaking, a computer-accessible medium may include non-transitory storage media or memory media such as magnetic or optical media, e.g., disk or DVD/CD coupled to computing device 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 800 as main memory 820 or another type of memory. Further, a computer-accessible medium may include transmission media or signals such as electrical, electromagnetic, or digital signals, conveyed via a communication medium such as a network and/or a wireless link, such as may be implemented via network interface 840. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

The various methods and/or techniques as illustrated in the figures and described herein represent exemplary embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended to embrace all such modifications and changes and, accordingly, the above description to be regarded in an illustrative rather than a restrictive sense.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A computer implemented method, comprising:
receiving input data for a primary neural network (PNN), the input data captured by one or more sensors, wherein the PNN is trained using a first set of training data to reduce a value of a loss function;
generating, from the PNN, an output based at least in part on the input data;
capturing inspection data associated with the generation of the output;
generating, from an inspection neural network (INN), an indication of reliability for the output from the PNN based at least in part on the inspection data, wherein the INN is trained using a second set of training data generated from applying the PNN to a third set of training data, wherein the third set of training data is different from the first set of training data used to train the PNN; and transmitting the output and the indication of reliability to a controller.

2. The computer implemented method of claim 1, wherein capturing the inspection data comprises including the generated output as part of the inspection data.

3. The computer implemented method of claim 1, wherein capturing the inspection data comprises including the input data as part of the inspection data.

4. The computer implemented method of claim 1, wherein capturing the inspection data comprises capturing one or more intermediate values generated by the PNN during the generation of the output.

5. The computer implemented method of claim 1, wherein:
receiving input data for the PNN comprises receiving an image;
generating the output comprises generating a confidence map associated with the image;
capturing the inspection data comprises capturing the confidence map; and
generating the indication of reliability comprises generating a reliability index computed from confidence values in the confidence map.

6. The computer implemented method of claim 1, wherein:
receiving input data for the PNN comprises receiving an image;
generating the output comprises generating a class probability vector associated with the image;
capturing the inspection data comprises capturing the class probability vector; and
generating the indication of reliability comprises generating a reliability index computed from confidence values in the class probability vector.

7. The computer implemented method of claim 1, further comprising:
determining, by the controller, that the output is reliable based at least in part on the indication of reliability; and
in response to the determination that the output is reliable, generating a control signal.

8. A system, comprising:
a sensor configured to capture sensor data;
a data analyzer implemented by one or more hardware processors and associated memory, configured to generate, from a primary neural network (PNN), an output based at least in part on the sensor data, wherein the PNN is trained using a first set of training data to reduce a value of a loss function; and
an analyzer inspector implemented by one or more hardware processors and associated memory, configured to:
capture inspection data associated with the generation of the output; and
generate, from an inspection neural network (INN), an indication of reliability for the output based at least in part on the inspection data;
wherein the PNN is trained using a second set of training data generated from applying the PNN to a third set of training data, wherein the third set of training data is different from the first set of training data used to train the INN.

9. The system of claim 8, further comprising:
a controller implemented by one or more hardware processors and associated memory, configured to:
receive the output from the data analyzer and the indication of reliability from the analyzer inspector; and
generate a control signal based at least in part on the output and the indication of reliability.

10. The system of claim 9, wherein:
the controller comprises a navigator for an autonomous vehicle;
the sensor comprises a first camera on the autonomous vehicle configured to capture an image;
the data analyzer is configured to generate the output, comprising a confidence map associated with the image indicating a drivable region in the image; and
the navigator navigates the autonomous vehicle based at least in part on the confidence map and the indication of reliability.

11. The system of claim 10, wherein the navigator is configured to:
determine, based at least in part on the indication of reliability, that the confidence map is not sufficiently reliable;
select a second sensor on the autonomous vehicle; and
use sensor data from the second sensor to navigate the autonomous vehicle.

12. The system of claim 9, wherein:
the controller comprises a navigator for an autonomous vehicle;
the sensor comprises a first camera on the autonomous vehicle configured to capture an image containing an object on a road;
the data analyzer is configured to generate the output, comprising a class probability vector associated with the image indicating a class of the object; and
the navigator navigates the autonomous vehicle based on the class of the object.

13. A method, comprising:
providing a primary neural network (PNN) configured to generate output from respective input data, wherein the PNN is trained using a first data set to reduce a value of a loss function;
providing an inspection neural network (INN) configured to receive inspection data associated with applications of the PNN and generate a reliability metric for the output of the PNN based at least in part on the inspection data, wherein the INN is trained using a first inspection data set generated from applying the PNN to a second data set that is different from the first data set used to train the PNN.

14. The method of claim 13, wherein providing an INN configured to receive inspection data associated with applications of the PNN comprises providing an INN that is configured to receive inspection data comprising one or more intermediate values generated during applications of the PNN.

15. The method of claim 13, wherein training the PNN comprises:
modifying data augmentation techniques used to augment the first data set;
augmenting the first data set using the data augmentation techniques to create an augmented first data set;
training the PNN using the augmented first data set; and
repeating the modifying, augmenting, and training until a determination that the PNN has achieved a desired performance.

16. The method of claim 13, wherein training the INN comprises:

modifying data augmentation techniques used to augment the second data set;
augmenting the second data set using the data augmentation techniques to create an augmented second data set;
applying the PNN to the augmented second data set to generate a particular inspection data set;
adding the particular inspection data set to a master inspection data set;
training the INN using the master inspection data set; and
repeating the modifying, augmenting, applying, adding, and training until a determination that the INN has achieved a desired performance.

17. The method of claim 16, wherein the second data set comprises one or more images, and augmenting the second data set comprises generating additional images using one or more of a set of image processing techniques including cropping, flipping, or scaling.

* * * * *